Aug. 27, 1968     T. C. WALDROP     3,398,654

SLOTTED BASE SWAB CUP

Filed Sept. 26, 1966

INVENTOR
TOM C. WALDROP

BY *Alexander & Powell*
ATTORNEYS

United States Patent Office 3,398,654
Patented Aug. 27, 1968

3,398,654
SLOTTED BASE SWAB CUP
Tom C. Waldrop, Fort Worth, Tex., assignor to Royal Industries, Inc., a corporation of Texas
Filed Sept. 26, 1966, Ser. No. 582,055
7 Claims. (Cl. 92—241)

ABSTRACT OF THE DISCLOSURE

A swab cup and reinforcing structure including a base member having radial slots for holding hooked reinforcing elements precisely aligned, the slots having outwardly curving lower surfaces matching the contours of the lower ends of the reinforcing elements and vertically supporting them, and the base member having outwardly extending projections near the tops of the slots, and a ring member located between the projections and the lower ends of the hooked reinforcing elements to be axially confined by both, while radially confining the reinforcing elements in the slots, the ring in some modifications being made slightly expansible.

---

This invention relates to improvements in metal-reinforced swab cups, and more particularly to improvements in base structures and in pivotal engagements thereof with longitudinal reinforcing elements, such as wires or stamped sheet metal elements.

The prior art shows several different basic structures for such pivotal engagements. For example, in patents such as Bell 2,480,830, Bowerman 2,862,776 and Losey 2,887,347 wire reinforcing members are captivated within drilled holes in metal flanges, and the lower ends of the wires are hooked to discourage axial displacement of the wires with respect to the drilled flange. In other patents such as Taylor 2,609,258 and Waldrop 3,081,136 the wires or sheet metal elements have their lower ends provided with an eye which surrounds a retaining ring embedded in the rubber body, the ring serving to resist axial displacement of the wires with respect to the body. The former class of cup structure has certain advantages: i.e., that the base member holds the wires in place more accurately while the rubber is being molded around them, and that the base member also gives the cup greater stability when mounted on a mandrel having a transverse shoulder on which the base of the cup must seat level. On the other hand, the class of cup reinforced only by wire structures is less expensive to manufacture and provides a more durable support for the longitudinal wires, since a drilled flange is not only expensive to make but the drilling thereof weakens it severely, whereas a continuous ring around which the wires are bent can be made very strong. Moreover, the individual wires when pivoted around and against a ring of circular cross-section pivot smoothly thereon, whereas a hooked wire, when inserted in a drilled cylindrical bore through a flange, does not pivot smoothly therein but tends to bind and spread the cylindrical walls apart and crack the flange thereadjacent.

It is a principal object of this invention to provide an improved cup structure having the advantages of both types of prior-art cups while avoiding their disadvantages. The improved cup employs a molded or cast base member having slots around its periphery to receive and orient the longitudinal reinforcing elements. The structure further includes a ring which helps captivate the lower ends of these elements, and the novel coorperation of the ring, the base, and the ends of the elements is such that the elements and the ring are supported against displacement in either direction axially of the cup with respect to the base.

Another important object of this invention is to provide cooperative structures including a base structure which is of a design capable of efficiently performing its stabilizing and supporting function, but at the same time lends itself to economical manufacture by molding or casting, thereby entirely avoiding expensive machining operations.

A further major object of this invention is to provide a base structure having outwardly-opening radial slots into which the reinforcing elements are laid, the slots being long enough as measured axially of the cup to maintain these elements always in planes including the cup axis.

A related major object of the invention is to provide the base and its slots, the retaining ring, and the reinforcing elements with cooperating structures which permit easy assembly of the three basic parts together and which, once assembled and embedded in an elastomeric body, positively prevents disassembly or undesirable displacement of any of these basic parts longitudinally of the cup with respect to the others.

Another object of the invention is to provide cooperating reinforcing elements and pivotal support for their lower ends wherein the shape of the slots and of the retaining ring cooperates with the shape of said lower ends to provide smooth pivoting action of the elements and wherein the pivoting action does not translate into a tilting and wedging action, tending to fracture the parts. Instead, outward forces are opposed and supported by an annular ring which, since it need not be machined, can be made of spring metal having great strength.

A further important object is to provide a novel engagement between the reinforcement elements, held in place radially by said annular ring and by the shape of the base at its slots, these parts being shaped and oriented to cooperate in such a way that, when the fluid loading of the cup is heavy from above it, thus tending to spread the cup radially outwardly at its base by pressure from within and tending to drive the reinforcement elements downwardly, the lower ends of the elements provide a component of force tending to compress the base radially inwardly and thereby oppose the severe forces attempting to spread it outwardly. This tendency of the inward and the outward forces to balance at the base member is of advantage since it permits the base to be cast or molded of materials having lower tensile strengths. The range of useful materials includes die cast zinc or aluminum, the former being less expensive; hard rubber, perhaps reinforced by metal or fibre inserts; plastic such as nylon and other resins; phenolics, such as molded Bakelite which bonds well to the rubber because its formaldehyde base is compatible with the most common of bonding-agent bases; and so on. The non-metallic bases are especially attractive from the point of view of resistance to corrosion and electrolysis.

The base itself can be made weaker than in many prior-art devices because only the retaining ring need resist the hydrostatic outwardly-acting forces. The ring should be strong, although for some reasons it may be desirable to permit the ring to expand to a limited and controlled extent. For example, the reinforcing elements tend to behave like rigid beams when the cup is loaded, so that they pivot outwardly into contact with the tubing walls near the top of the cup. Under greater loading the wires bend into contact with the tubing further down their lengths. Since their lower ends are radially confined only by the ring, if the ring can expand somewhat, greater lengths of the reinforcing elements can be brought into contact with the tubing thereby increasing the effective axial length of the seal. For this purpose, the ring could be made in the form of several helical convolutions of spring material in contact with each other, and resembling a well-known type of key-ring. Alternatively the ring could be made of expansible material. Recently, new types of deep-well tubing have come into use, such tubing having internal, as well as external upsets, the internal upsets comprising restrictions in the bore thereof. Therefore the cups have to be made smaller in order to pass through these restrictions, and as a result, they must be capable of greater degrees of expansion under load. .085″ clearance is usual between cups and the nominal tubing internal diameter. A stretchable ring helps to facilitate the required greater degree of expansion.

Circular reinforcing wires comprising said reinforcing elements have the practical advantage that an operator can tell by glancing at a cup how much it is worn since the circular wires show more width as they wear until they are worn half-way through. However, rectangular reinforcement elements, or sheet metal stampings lack this feature. By recessing the retaining ring inside of the radially outer limits of the reinforcing elements a predetermined amount, a warning of severe wear can be had when the metal of the ring starts showing in the rubber surface near the base.

Throughout this specification the terms "up" and "down," "upper" and "lower," etc., shall refer respectively to locations or positions counter to the direction of fluid pressure, and to locations and positions in the direction of the fluid pressure.

Other objects and advantages of my invention will become apparent during the following discussion of the drawings, wherein.

Figure 1:
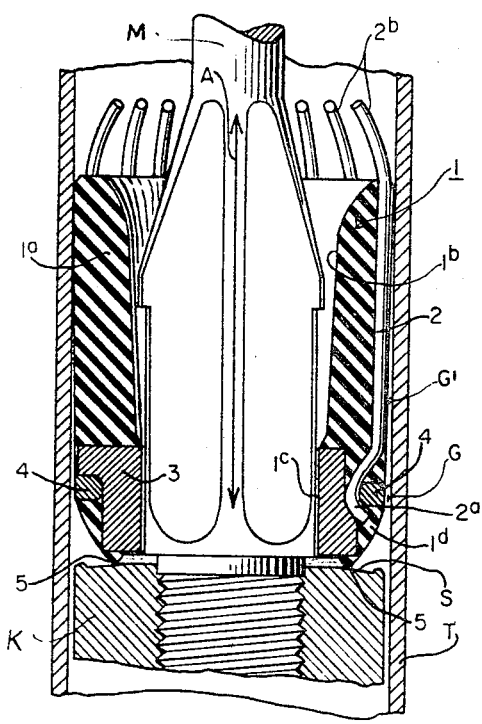
FIG. 1 is a longitudinal sectional view taken through a cup according to the invention and showing the cup supported on a mandrel within well tubing, the cup being illustrated almost in relaxed condition, i.e., just barely in contact with the tubing.

Referring now to the drawings, FIG. 1 shows a cup according to the present invention located within tubing T and mounted upon a mandrel M of conventional design, the structure of this mandrel forming no part of the present invention since it is similar to the mandrel illustrated in Patent 2,862,776. The lower end of the mandrel M is threaded and screwed into a coupling K which provides a shoulder S upon which the swab cup seals in a manner well know in the prior art.

The mandrel and shoulder thus support the swab cup 1 which comprises a rubber body 1a having an upper bore 1b located above a smaller bore 1c, the cup being of annular cross-section. Near the lower end 1d of the cup is an annular base 3 embedded and vulcanized in the rubber and serving to receive and locate the lower ends of a plurality of metal reinforcing elements 2. Each of these reinforcing elements includes an arc-shaped or hooked lower end 2a which cooperates with the base 3 and is held in place with respect thereto by a surrounding annular ring 4. The upper ends 2b of the reinforcing elements 2 are bent inwardly so as to prevent them from snagging in joints of the tubing being swabbed by the cup. As illustrated in FIG. 1 the cup is almost in relaxed condition. In fully relaxed condition the reinforcing elements 2 and the rubber walls therebetween are substantially parallel to the tubing walls and slightly spaced therefrom all the way up.

When the mandrel M is reciprocated within the tubing T and while it is rising therein, the cup seals against the upper surface of the coupling K by compression of the resilient lower bead 5 between the base member 3 and the shoulder S. The upper portion of the cup as it rises in the tubing is expanded by fluid pressure into contact therewith, and the reinforcing elements pivot outwardly about the ring 4. As the fluid loading is increased on the cup, the contact area thereof with the tubing walls increases until the walls are contacted by the rubber body 1a and the reinforcing elements 2 along most of their length as measured in the direction of the axis A of the cup. The general operation of the cup need not be further described at this point in view of the fact that the general principles are well-known in the prior art.

The important novelty of the present invention lies in the manner of pivotally captivating the lower ends 2a of the reinforcing elements 2 in the vicinity of the bottom of the cup in such a way that the elements pivot around their lower ends quite easily, are prevented from displacement in the direction of the axis A either upwardly or downwardly, and are confined by the ring against outward displacement in the radial direction R.

Figure 3:
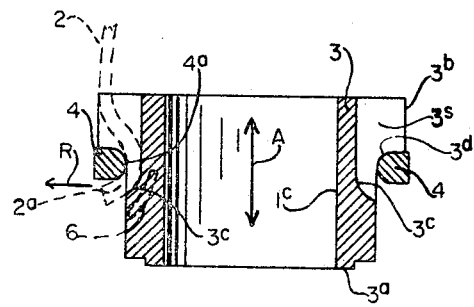
FIG. 3 is a sectional view through the base member shown in FIG. 2, and additionally showing an annular ring used to support cup reinforcing elements.
Figure 6:
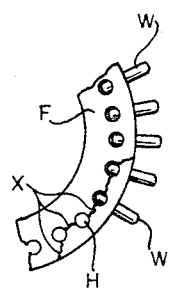
FIG. 6 is a view showing part of a base flange according to the prior art to illustrate the tendency thereof to fracture in the vicinity of drilled holes therethrough.

One of the most common prior art structures employs wires having hooked lower ends of the same general shape as shown at 2a in the present FIG. 3, and in which the hooked lower ends of the wires are passed through drilled holes in the flange as shown in the present FIG. 6. In this figure the wires are labeled W, the holes are labeled H and the flange is labeled F and usually comprises a part of a larger base member. As mentioned in the objects of this invention, when the wires are subjected to severe forces, usually downwardly and/or outwardly, the flange is frequently cracked as at X, and thus the cup is severely weakened with the result that it fails almost immediately. Basically, the reason for such failure is that the flange F cannot be made of a spring-like metal because it has to be drilled, and it is this drilling which further weakens it. Moreover, the flange F cannot be made very thick as measured axially of the cup because a thick flange causes binding of the wires W in the drilled holes H, which binding is of course worse with thicker flanges. Thus, a thicker flange prevents proper pivoting of the wires and a thinner flange is easily fractured, and therefore a less-than-satisfactory compromise is necessary when this type of prior art structure is resorted to.

Figure 2:
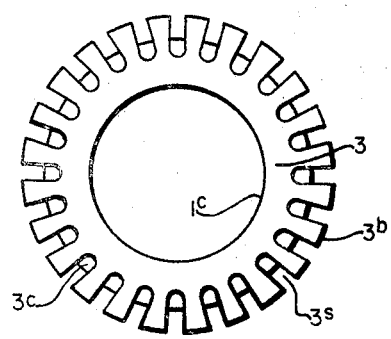
FIG. 2 is a plan view of a base member to be inserted in the rubber cup shown in FIG. 1.
Figure 4:
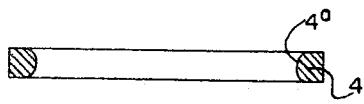
FIG. 4 is a cross-sectional view through a D-shaped reinforcing ring.

Furthermore, it is necessary to provide a pivotal structure which also orients the reinforcing elements 2 so that they all lie parallel to the axis A during molding of the rubber body 1a around the wires and the base. Otherwise, it is almost impossible to insure that the wires will be properly distributed around the periphery of the finished cup. The applicant meets the above requirements by providing a base structure having the shape shown in FIGS. 2 and 3, this base structure comprising an annular member having an internal bore comprising the aforementioned bore 1c, having a lower end 3a adjacent to the bead 5 and having an upper portion including projections 3b of enlarged diameter, which upper portion is slotted as at 3s. The length of each slot 3s as measured in the axial direction is long enough to support a reinforcing element 2 against skewing out of parallel with the axis A, and the width of each slot as measured circumferentially of the base member is great enough to snugly receive one reinforcing element 2 without binding its movement in the slot. The inside surface of the lower end of each slot is curved outwardly as at 3c so that the arcuate lower end 2a of the reinforcing member 2 rests upon the curved portion 3c of the slot, and can pivot thereagainst. The lower contour of each projection 3b lies in a common plane and is curved downwardly as at 3d to match the curvature of the ring member 4 as at 4a, and this curvature is essentially the same as the outer curvature of the recessed lower end 2a of a reinforcing element 2. The ring 4 shown in FIG. 4 is one piece, and can be made either of an expansible material or of a substantially rigid material such as steel. The various modified characteristics which are desirable for the D-ring member will be described hereinafter in connection with FIG. 5.

Prior to molding of the rubber body, the basic reinforcement members are assembled in the following manner. First, the ring 4 is placed against the surface 3d in the position shown in FIG. 3 and is held in this position. The reinforcing elements 2 are then applied one at a time by bringing each element to a position in which it makes an angle of about 45 degrees outwardly with respect to the cup axis A. The lower end 2a of each reinforcing element is then passed into a slot 3s, and the reinforcing element is then pivoted inwardly while passing the lower end 2a between the surface 4a and the surface 3c until the reinforcing element assumes the position shown in FIGS. 1 and 3. When this position is reached by all of the reinforcing elements 2, the ring 4 is captivated in such a way as to make it impossible for the ring to drop downwardly with respect to the base member 3. Moreover, the lower ends 2a of the reinforcing elements 2 cannot move downwardly with respect to the base member 3 since the surface 3c provides vertical support for them. The reinforcing elements 2 cannot be upwardly withdrawn from the base member 3 because their lower ends 2a are vertically confined by the surface 4a of the ring 4 which is in turn prevented from moving upwardly by the surface 3d. The elements are of course supported against moving inwardly by the inner surface 3c of the slot 3s, and the ring 4 prevents the lower ends 2a of the reinforcing elements 2 from spreading outwardly. Thus, the said lower ends and the ring 4 and the base 3 are all captivated together, but the structure is such as to permit pivoting of the wires 2 through the small angles required to permit the reinforcing elements 2 to expand into contact with the inner surface of the tubing T.

The basic idea of the invention is to provide support for the hooked lower ends of the reinforcing elements by entering the ends into radially disposed slots shaped to prevent inward or downward escape of the members, and by then confining the lower ends of the reinforcing elements against upward or outward escape from the slots by disposing annular means around the hooked ends of the elements. As pointed out above, this annular means is all that prevents outward displacement of the reinforcing elements.

However, as disclosed in connection with FIGS. 6 and 9 of my Patent 3,081,136 it may be desirable to permit the lower ends of the reinforcing elements to have a limited outward expansion capability so that the elements do not have to bend very much above their lower ends in order to provide axially-long sealing contact with the inner tubing surface. It is therefore permissible for the ring 4 of the present invention to expand somewhat, provided that it does not expand enough that any of the arched lower ends 2a are permitted to escape downwardly past the surface 3c so that they are no longer vertically supported by that surface. Supposing therefore that expansion of the ring 4 is desired for this purpose, the degree of expansion of the ring can be controlled by the amount of gap G between the outer periphery of the ring 4 and the maximum inner diameter of the tubing T. In other words, if the ring 4 is allowed to expand outwardly flush with the outer surface of the reinforcing elements 2, the ring and the elements will all contact the tubing T at the same time. In this event the surface 3c should be made to extend outwardly toward the tubing wall far enough to prevent downward escape of the ends 2a therepast, even after the cup has been used enough so that the outer surfaces of the reinforcing elements and the ring surfaces are rather worn. Alternatively, the outer surfaces of the ring 4 could be spaced by a gap G which is a little greater than the gap G' between the outer surfaces of the reinforcing elements 2 and the tubing T. Thus, the reinforcing elements 2 could experience a certain amount of wear before the ring 4 touches the tubing walls. This structure would permit the operator of the well to be warned that a predetermined degree of wear has taken place with respect to the reinforcing element surfaces at the time when the ring 4 just begins to wear against the tubing walls.

Figure 5:
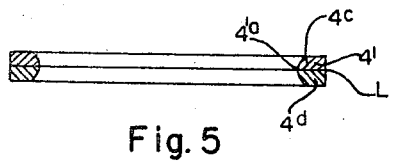
FIG. 5 is a sectional view through a modified form of D-ring.

In the event that an expansible ring is used, the expansion characteristic may be provided by either the selection of a stretchable material for the ring 4, or alternatively expansion may be provided by the structure of the ring itself. For example, FIG. 5 shows a ring 4' which is made up of two or more helical convolutions of a spring material in a manner which has been practiced for many years in the manufacture of key-rings. Such a ring includes two convolutions 4c and 4d, although it is to be understood that any number of convolutions may be employed, or that the dividing line L between convolutions can be disposed axially of the ring, rather than radially as illustrated. In any event, it is desirable to provide the inner surface 4'a with a semi-circular shape matching the hooked curve of the lower end 2a of a reinforcing element 2 for the purpose of insuring easy pivoting of the elements when urged outwardly against the confining force of the D-ring 4'.

As pointed out above, the machining of a metal flange is not only expensive, but it may also materially weaken the structure, especially where holes are drilled through a thin flange as illustrated in the present FIG. 6. Since in the present novel structure the greatest stresses are outward stresses against the ring 4 and this ring need not be drilled, it can therefore be made of as strong a material as desired, including hardened steel. Thus, the present structure is inherently very durable. On the other hand, since the D-ring and the portion of the base which is below the projections 3b are relatively strong and since it is these members which are subjected to the greatest forces, the upper portion of the base 3 need not be very great in strength, because its main function is only to precisely orient the reinforcing elements while the latter are being embedded in and vulcanized to the rubber body 1a. Thus, the base member's structure is especially adaptable to manufacture by casting of a metal, or molding of a plastic, so that no machining of any sort is necessary, and so that the base member can be manufactured very economically. For instance, the base can even be made of hard rubber, plastic, or other easily handled materials, and in such event the structure can be internally reinforced by a small metal insert 6 as shown to the left in FIG. 3. On the other hand, a base made out of a phenolic resin such as Bakelite would inherently have sufficient strength to resist compressive forces acting upon the surfaces 3c. The plastic could be further reinforced by filar or cloth inserts. On the other hand, some of the easily-cast metals have proven extremely satisfactory, for instance a zinc casting is currently used in the working embodiments of the invention, although aluminum has also been successfully used. The zinc is somewhat cheaper and easier to handle since it melts at a lower temperature than aluminum.

The present invention is not to be limited to the exact forms shown in the drawings, for obviously changes may be made therein within the scope of the following claims.

I claim:
1. A reinforced swab cup to be mounted on a mandrel for swabbing tubing comprising, an annular resilient body of diameter slightly smaller than said tubing and having an axial bore therethrough to receive said mandrel; a plurality of axially disposed reinforcing elements embedded in said body and circumferentially spaced therearound, and each element including a lower retaining portion located near the lower end of the cup and hooked as viewed in a radial plane and the bottom of the hooked portion curving outwardly of the cup; an annular base embedded in the body near its lower end and having an annular series of axially disposed slots extending radially into its outer surface and each slot having an inner surface a portion of which is arcuate and curves out- wardly at the lower end of the slot and conforms with and supports the hooked bottom portion of a reinforcing element; and annular ring means surrounding and occupying said hooked portions to captivate said elements in the slots.

2. In a cup as set forth in claim 1, the base having near its upper end outwardly extending projections located between the upper ends of said slots and disposed substantially normal to the axis of the cup, the projections being located above the arcuate inner surfaces of the slots; and said ring means snugly surrounding said elements above the outward curve of their lower portions and below said projections.

3. In a cup as set forth in claim 2, said reinforcing elements being embedded in the body flush with its outer surface above said lower portions and being inwardly recessed in the centers of said hooked portions below said projections, and said ring means surrounding the recessed portions.

4. In a cup as set forth in claim 3, said recessed portion being arcuate as viewed in an axial plane, and the inner surface of said ring means being curved in cross-section to facilitate pivoting of the arcuate portion thereabout, and the ring means being axially snugly confined between the projections and the outwardly-curved bottoms of said hooked portions.

5. In a cup as set forth in claim 3, said ring means having an outer peripheral surface confined within the outer periphery of the body and the outer surfaces of the reinforcing elements embedded therein, and the ring means being radially expansible toward the inside surface of the tubing.

6. A reinforcing assembly for a swab cup, comprising an annular series of substantially axially-disposed reinforcing elements each having a hook portion terminating in an outwardly curved lower end; an annular base having a circumferential series of outwardly-opening axial slots snugly receiving said lower ends and said base having outwardly-extending projections between the slots and located substantially above said hook portions, and the slots extending below said hook portions and curving radially outwardly in contact with and supporting the lower ends of said elements against downward displacement with respect to the base; and an annular ring passing around said assembly and pivotally confining said hook portions to hold the elements in the slots, and said ring engaging the base below said projections to prevent axial upward displacement of the hook portions and ring with respect to the base.

7. In an assembly as set forth in claim 6, said base comprising a one-piece mold-shaped member.

References Cited
UNITED STATES PATENTS

| | | | |
|---|---|---|---|
| 1,613,066 | 1/1927 | Turner | 92—241 |
| 2,317,433 | 4/1943 | Bell | 92—254 |
| 2,352,810 | 7/1944 | Taylor | 92—241 |
| 2,862,776 | 12/1958 | Bowerman | 92—241 |
| 2,917,352 | 12/1959 | Taylor | 92—241 |
| 3,081,136 | 3/1963 | Waldrop | 92—241 |

MARTIN P. SCHWADRON, Primary Examiner.

G. N. BAUM, Assistant Examiner.